United States Patent
Weber et al.

(10) Patent No.: US 10,119,405 B2
(45) Date of Patent: Nov. 6, 2018

(54) COOLING CIRCUIT FOR A MULTI-WALL BLADE

(71) Applicant: General Electric Company, Schenectady, NY (US)

(72) Inventors: David Wayne Weber, Simpsonville, SC (US); Brendon James Leary, Simpsonville, SC (US); Jacob Charles Perry, II, Taylors, SC (US); Joseph Anthony Weber, Simpsonville, SC (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 368 days.

(21) Appl. No.: 14/977,078

(22) Filed: Dec. 21, 2015

(65) Prior Publication Data
US 2017/0175540 A1    Jun. 22, 2017

(51) Int. Cl.
| | | |
|---|---|---|
| *F02C 1/00* | (2006.01) |
| *F01D 5/18* | (2006.01) |
| *F01D 5/14* | (2006.01) |
| *F02C 3/04* | (2006.01) |

(52) U.S. Cl.
CPC ............. *F01D 5/187* (2013.01); *F01D 5/147* (2013.01); *F02C 3/04* (2013.01); *F05D 2220/32* (2013.01); *F05D 2240/307* (2013.01); *F05D 2240/35* (2013.01); *F05D 2260/202* (2013.01)

(58) Field of Classification Search
CPC ....................................... F01D 5/187
See application file for complete search history.

(56) References Cited

U.S. PATENT DOCUMENTS

| | | | |
|---|---|---|---|
| 3,191,908 A | 6/1965 | Powell et al. | |
| 4,474,532 A | 10/1984 | Pazder | |
| 4,500,258 A | 2/1985 | Dodd et al. | |
| 4,650,399 A * | 3/1987 | Craig ............... | B23P 15/04 |
| | | | 416/193 A |
| 4,753,575 A | 6/1988 | Levengood et al. | |

(Continued)

FOREIGN PATENT DOCUMENTS

| | | |
|---|---|---|
| EP | 2037081 A1 | 3/2009 |
| EP | 2 713 011 A1 | 4/2014 |
| JP | 2002242607 A | 8/2002 |

OTHER PUBLICATIONS

U.S. Appl. No. 14/977,152, Office Action 1 dated Sep. 14, 2017, 15 pages.

(Continued)

*Primary Examiner* — Gerald L Sung
(74) *Attorney, Agent, or Firm* — Ernest G. Cusick; Hoffman Warnick LLC (57) ABSTRACT

A cooling system according to an embodiment includes: a forked passage cooling circuit, the forked passage cooling circuit including a first leg and a second leg; and an air feed cavity for supplying cooling air to the first leg and the second leg of the forked passage cooling circuit; wherein the first leg of the forked passage cooling circuit extends radially outward from and at least partially covers at least one central plenum of a multi-wall blade, and wherein the second leg of the forked passage cooling circuit extends radially outward from and at least partially covers a first set of near wall cooling channels in the multi-wall blade.

20 Claims, 7 Drawing Sheets

(56) References Cited

U.S. PATENT DOCUMENTS

| | | | |
|---|---|---|---|
| 5,296,308 | A | 3/1994 | Caccavale et al. |
| 5,356,265 | A * | 10/1994 | Kercher ............... F01D 5/186 |
| | | | 416/97 R |
| 5,382,135 | A | 1/1995 | Green |
| 5,403,159 | A | 4/1995 | Green et al. |
| 5,702,232 | A * | 12/1997 | Moore ................ F01D 5/186 |
| | | | 416/95 |
| 5,813,835 | A | 9/1998 | Corsmeier et al. |
| 5,853,044 | A | 12/1998 | Wheaton et al. |
| 6,196,792 | B1 | 3/2001 | Lee et al. |
| 6,220,817 | B1 | 4/2001 | Durgin et al. |
| 6,264,428 | B1 | 7/2001 | Dailey et al. |
| 6,416,284 | B1 | 7/2002 | Demers et al. |
| 6,478,535 | B1 | 11/2002 | Chung et al. |
| 6,491,496 | B2 | 12/2002 | Starkweather |
| 6,705,836 | B2 | 3/2004 | Bourriaud et al. |
| 6,887,033 | B1 | 5/2005 | Phillips et al. |
| 6,916,155 | B2 | 7/2005 | Eneau et al. |
| 6,974,308 | B2 | 12/2005 | Halfmann et al. |
| 7,104,757 | B2 | 9/2006 | Gross |
| 7,217,097 | B2 | 5/2007 | Liang |
| 7,303,376 | B2 | 12/2007 | Liang |
| 7,481,623 | B1 | 1/2009 | Liang |
| 7,527,474 | B1 | 5/2009 | Liang |
| 7,527,475 | B1 | 5/2009 | Liang |
| 7,607,891 | B2 | 10/2009 | Cherolis et al. |
| 7,625,178 | B2 | 12/2009 | Morris et al. |
| 7,641,444 | B1 | 1/2010 | Liang |
| 7,686,581 | B2 | 3/2010 | Brittingham et al. |
| 7,780,413 | B2 | 8/2010 | Liang |
| 7,780,415 | B2 | 8/2010 | Liang |
| 7,785,072 | B1 | 8/2010 | Liang |
| 7,819,629 | B2 | 10/2010 | Liang |
| 7,838,440 | B2 | 11/2010 | Park |
| 7,857,589 | B1 * | 12/2010 | Liang ................. F01D 5/187 |
| | | | 416/97 R |
| 7,862,299 | B1 | 1/2011 | Liang |
| 7,901,183 | B1 | 3/2011 | Liang |
| 7,914,257 | B1 | 3/2011 | Liang |
| 7,980,822 | B2 | 7/2011 | Cunha et al. |
| 8,011,888 | B1 * | 9/2011 | Liang ................. F01D 5/187 |
| | | | 416/92 |
| 8,047,790 | B1 | 11/2011 | Liang |
| 8,087,891 | B1 | 1/2012 | Liang |
| 8,157,505 | B2 | 4/2012 | Liang |
| 8,292,582 | B1 | 10/2012 | Liang |
| 8,444,386 | B1 | 5/2013 | Liang |
| 8,616,845 | B1 | 12/2013 | Liang |
| 8,628,298 | B1 | 1/2014 | Liang |
| 8,678,766 | B1 | 3/2014 | Liang |
| 8,734,108 | B1 | 5/2014 | Liang |
| 2003/0223862 | A1 | 12/2003 | DeMarche et al. |
| 2005/0008487 | A1 | 1/2005 | Lee et al. |
| 2005/0031452 | A1 * | 2/2005 | Liang ................. F01D 5/186 |
| | | | 416/97 R |
| 2005/0226726 | A1 | 10/2005 | Lee et al. |
| 2006/0222495 | A1 | 10/2006 | Liang |
| 2007/0128031 | A1 * | 6/2007 | Liang ................. F01D 5/187 |
| | | | 416/97 R |
| 2007/0128032 | A1 | 6/2007 | Lee et al. |
| 2008/0118366 | A1 | 5/2008 | Correia et al. |
| 2008/0175714 | A1 * | 7/2008 | Spangler ............ F01D 5/186 |
| | | | 416/232 |
| 2009/0104042 | A1 | 4/2009 | Liang |
| 2009/0175733 | A1 | 7/2009 | Poon et al. |
| 2010/0226789 | A1 | 9/2010 | Liang |
| 2011/0123310 | A1 | 5/2011 | Beattie et al. |
| 2011/0236221 | A1 * | 9/2011 | Campbell ............ F01D 5/148 |
| | | | 416/97 R |
| 2012/0082566 | A1 | 4/2012 | Ellis et al. |
| 2012/0207614 | A1 | 8/2012 | Lee et al. |
| 2013/0171003 | A1 | 7/2013 | Ellis et al. |
| 2014/0096538 | A1 | 4/2014 | Boyer et al. |
| 2015/0059355 | A1 | 3/2015 | Feigl et al. |
| 2015/0184519 | A1 | 7/2015 | Foster et al. |
| 2015/0184538 | A1 | 7/2015 | Smith |
| 2015/0322008 | A1 | 11/2015 | Hilpert et al. |
| 2016/0194965 | A1 | 7/2016 | Spangler |
| 2016/0312632 | A1 | 10/2016 | Hagan et al. |
| 2016/0312637 | A1 | 10/2016 | Duguay |
| 2017/0173672 | A1 | 6/2017 | Foster et al. |
| 2017/0175443 | A1 | 6/2017 | Pesticcio |
| 2017/0175540 | A1 | 6/2017 | Weber et al. |
| 2017/0175541 | A1 | 6/2017 | Weber et al. |
| 2017/0175542 | A1 | 6/2017 | Weber et al. |
| 2017/0175544 | A1 | 6/2017 | Smith et al. |
| 2017/0175545 | A1 | 6/2017 | Foster et al. |
| 2017/0175546 | A1 | 6/2017 | Smith et al. |
| 2017/0175547 | A1 | 6/2017 | Smith et al. |
| 2017/0175548 | A1 | 6/2017 | Smith et al. |
| 2017/0175550 | A1 | 6/2017 | Smith et al. |

OTHER PUBLICATIONS

U.S. Appl. No. 14/977,124, Office Action 1 dated Oct. 10, 2017, 15 pages.

Extended European Search Report and Opinion issued in connection with corresponding EP Application No. 16203699.0 dated Apr. 28, 2017.

U.S. Appl. No. 14/977,175, Office Action 1 dated Nov. 24, 2017, 25 pages.

U.S. Appl. No. 14/977,200, Office Action dated Dec. 19, 2017, 23 pages.

U.S. Appl. No. 14/977,152, Final Office Action 1 dated Dec. 26, 2017, 15 pages.

U.S. Appl. No. 14/977,228, Notice of Allowance dated Feb. 12, 2018, 34 pages.

U.S. Appl. No. 14/977,247, Notice of Allowance dated Feb. 12, 2018, 24 pages.

U.S. Appl. No. 14/977,270, Office Action dated Mar. 21, 2018, 42 pages.

U.S. Appl. No. 14/977,124, Notice of Allowance dated Mar. 19, 2018, 21 pages.

U.S. Appl. No. 14/977,102, Office Action dated Mar. 30, 2018, 39 pages.

U.S. Appl. No. 14/977,200, Notice of Allowance dated May 2, 2018, 18 pages.

U.S. Appl. No. 14/977,270, Notice of Allowance dated Jul. 13, 2018, 24 pages.

EP Search Report and Written Opinion for corresponding EP Patent Application No. 16203125.6 dated Apr. 28, 2017, 7 pages.

U.S. Appl. No. 14/977,102, Notice of Allowance dated Jul. 17, 2018, 18 pages.

U.S. Appl. No. 15/239,968 Office Action dated Aug. 27, 2018, 42 pages.

U.S. Appl. No. 15/239,940, Office Action dated Aug. 27, 2018, 41 pages.

U.S. Appl. No. 15/239,930, Office Action dated Aug. 27, 2018, 47 pages.

U.S. Appl. No. 15/239,985, Office Action dated Aug. 29, 2018, 40 pages.

* cited by examiner

COOLING CIRCUIT FOR A MULTI-WALL BLADE

CROSS-REFERENCE TO RELATED APPLICATIONS

This application is related to co-pending U.S. application Ser. Nos. 14/977,102, 14/977,124, 14/977,152, 14/977,200, 14/977,175, 14/977,228, 14/977,247, and 14/977,270, all filed on Dec. 21, 2015.

BACKGROUND OF THE INVENTION

The disclosure relates generally to turbine systems, and more particularly, to a cooling circuit for a tip area of a multi-wall blade.

Gas turbine systems are one example of turbomachines widely utilized in fields such as power generation. A conventional gas turbine system includes a compressor section, a combustor section, and a turbine section. During operation of a gas turbine system, various components in the system, such as turbine blades, are subjected to high temperature flows, which can cause the components to fail. Since higher temperature flows generally result in increased performance, efficiency, and power output of a gas turbine system, it is advantageous to cool the components that are subjected to high temperature flows to allow the gas turbine system to operate at increased temperatures.

Turbine blades typically contain an intricate maze of internal cooling channels. Cooling air provided by, for example, a compressor of a gas turbine system may be passed through the internal cooling channels to cool the turbine blades.

Multi-wall turbine blade cooling systems may include internal near wall cooling circuits. Such near wall cooling circuits may include, for example, near wall cooling channels adjacent the outside walls of a multi-wall blade. The near wall cooling channels are typically small, requiring less cooling flow, while still maintaining enough velocity for effective cooling to occur. Other, typically larger, low cooling effectiveness internal channels of a multi-wall blade may be used as a source of cooling air and may be used in one or more reuse circuits to collect and reroute "spent" cooling flow for redistribution to lower heat load regions of the multi-wall blade. At the tip of a multi-wall blade, the near wall cooling channels and low cooling effectiveness internal channels are exposed to very high heat loads.

BRIEF DESCRIPTION OF THE INVENTION

A first aspect of the disclosure provides a cooling system including: a forked passage cooling circuit, the forked passage cooling circuit including a first leg and a second leg; and an air feed cavity for supplying cooling air to the first leg and the second leg of the forked passage cooling circuit; wherein the first leg of the forked passage cooling circuit extends radially outward from and at least partially covers at least one central plenum of a multi-wall blade, and wherein the second leg of the forked passage cooling circuit extends radially outward from and at least partially covers a first set of near wall cooling channels in the multi-wall blade.

A second aspect of the disclosure provides a multi-wall turbine blade, including: a cooling system disposed within the multi-wall turbine blade, the cooling system including: a forked passage cooling circuit, the forked passage cooling circuit including a first leg and a second leg; and an air feed cavity for supplying cooling air to the first leg and the second leg of the forked passage cooling circuit; wherein the first leg of the forked passage cooling circuit extends radially outward from and at least partially covers at least one central plenum of a multi-wall blade, and wherein the second leg of the forked passage cooling circuit extends radially outward from and at least partially covers a first set of near wall cooling channels in the multi-wall blade.

A third aspect of the disclosure provides a turbomachine, including: a gas turbine system including a compressor component, a combustor component, and a turbine component, the turbine component including a plurality of turbine buckets, and wherein at least one of the turbine buckets includes a multi-wall blade; and a cooling system disposed within the multi-wall blade, the cooling system including: a forked passage cooling circuit, the forked passage cooling circuit including a first leg and a second leg; and an air feed cavity for supplying cooling air to the first leg and the second leg of the forked passage cooling circuit; wherein the first leg of the forked passage cooling circuit extends radially outward from and at least partially covers at least one central plenum of the multi-wall blade, and wherein the second leg of the forked passage cooling circuit extends radially outward from and at least partially covers a first set of near wall cooling channels in the multi-wall blade.

The illustrative aspects of the present disclosure solve the problems herein described and/or other problems not discussed.

BRIEF DESCRIPTION OF THE DRAWINGS

These and other features of this disclosure will be more readily understood from the following detailed description of the various aspects of the disclosure taken in conjunction with the accompanying drawings that depict various embodiments of the disclosure.

It is noted that the drawing of the disclosure is not to scale. The drawing is intended to depict only typical aspects of the disclosure, and therefore should not be considered as limiting the scope of the disclosure. In the drawing, like numbering represents like elements between the drawings.

DETAILED DESCRIPTION OF THE INVENTION

Figure 9:
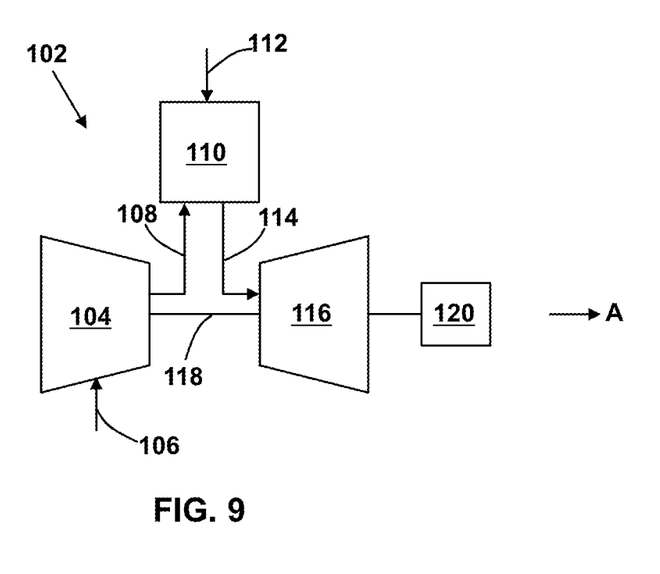
FIG. 9 is a schematic diagram of a gas turbine system according to various embodiments.

In the Figures, for example in FIG. 9, the "A" axis represents an axial orientation. As used herein, the terms "axial" and/or "axially" refer to the relative position/direction of objects along axis A, which is substantially parallel with the axis of rotation of the turbomachine (in particular, the rotor section). As further used herein, the terms "radial" and/or "radially" refer to the relative position/direction of objects along an axis (r), which is substantially perpendicular with axis A and intersects axis A at only one location. Additionally, the terms "circumferential" and/or "circumferentially" refer to the relative position/direction of objects along a circumference (c) which surrounds axis A but does not intersect the axis A at any location.

As indicated above, the disclosure relates generally to turbine systems, and more particularly, to a cooling circuit for cooling a tip area of a multi-wall blade.

According to embodiments, the cooling circuit is configured to cool the tip area of a multi-wall blade of a gas turbine engine, while providing shielding to low cooling effectiveness internal channels and providing cooling film. Shielding may also be provided to high cooling effectiveness near wall cooling channels. The cooling circuit may include a forked passage, which may be fed with cooling from a low cooling effectiveness internal channel or a near wall cooling channel. Air passes through the cooling circuit, providing convention cooling, and is exhausted as cooling film to cool the tip area of the multi-wall blade.

Figure 1:
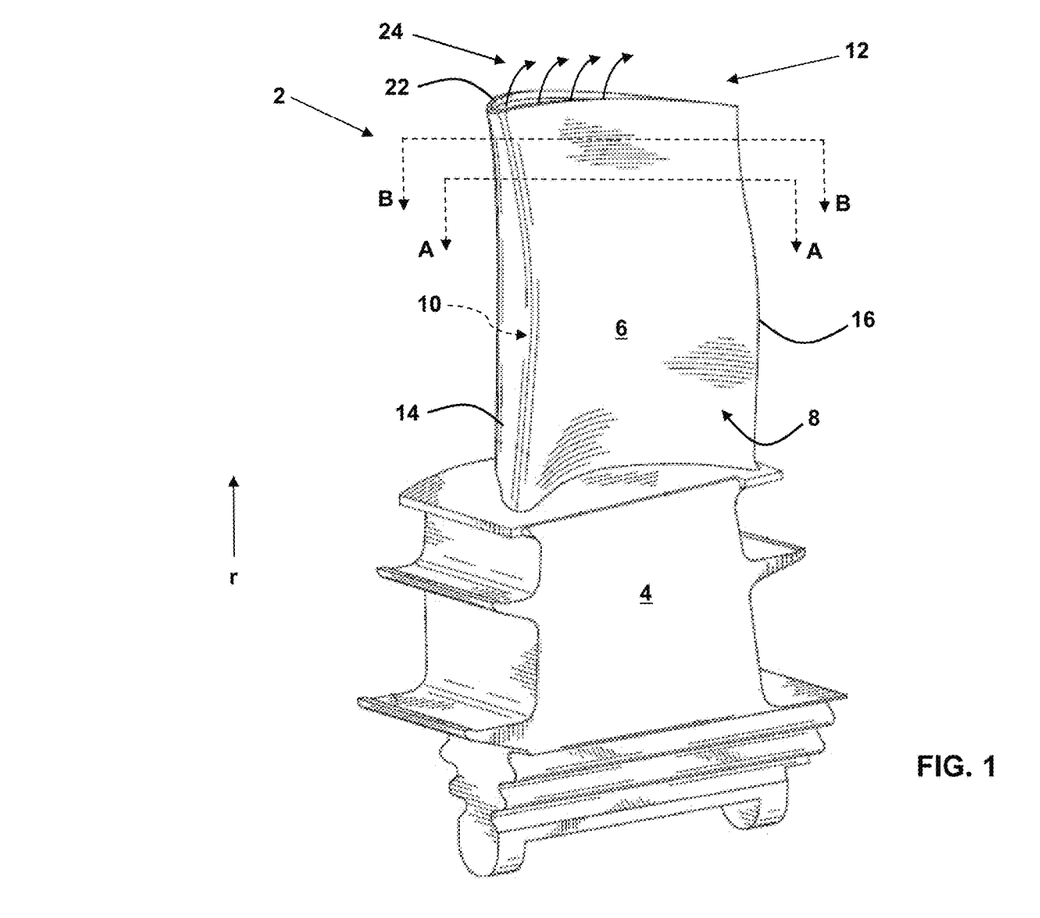
FIG. 1 shows a perspective view of a turbine bucket including a multi-wall blade according to embodiments.

Turning to FIG. 1, a perspective view of a turbine bucket 2 is shown. The turbine bucket 2 includes a shank 4 and a multi-wall blade 6 coupled to and extending radially outward from the shank 4. The multi-wall blade 6 includes a pressure side 8, an opposed suction side 10, and a tip area 12. The multi-wall blade 6 further includes a leading edge 14 between the pressure side 8 and the suction side 10, as well as a trailing edge 16 between the pressure side 8 and the suction side 10 on a side opposing the leading edge 14.

The shank 4 and multi-wall blade 6 may each be formed of one or more metals (e.g., steel, alloys of steel, etc.) and may be formed (e.g., cast, forged or otherwise machined) according to conventional approaches. The shank 4 and multi-wall blade 6 may be integrally formed (e.g., cast, forged, three-dimensionally printed, etc.), or may be formed as separate components which are subsequently joined (e.g., via welding, brazing, bonding or other coupling mechanism).

Figure 2:
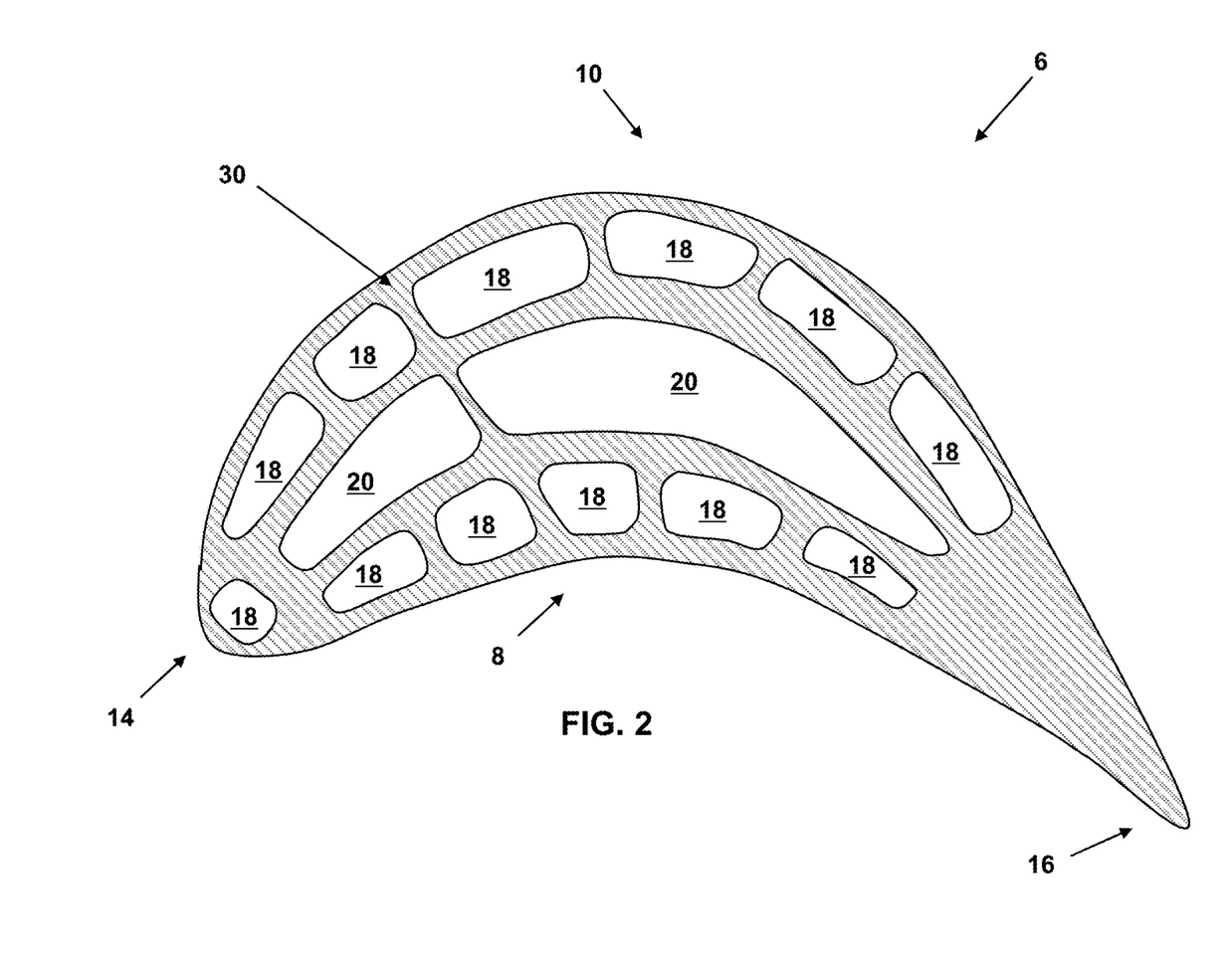
FIG. 2 is a cross-sectional view of the multi-wall blade of FIG. 1, taken along line A-A in FIG. 1 according to various embodiments.

FIG. 2 is a cross-sectional view of the multi-wall blade 6 taken along line A-A of FIG. 1. As shown, the multi-wall blade 6 may include, for example, an arrangement 30 of cooling channels including a plurality of high effectiveness near wall cooling channels 18 and one or more low cooling effectiveness internal channels 20, hereafter referred to as "central plenums." Various cooling circuits can be provided using different combinations of the near wall cooling channels 18 and central plenums 20.

Figure 3:
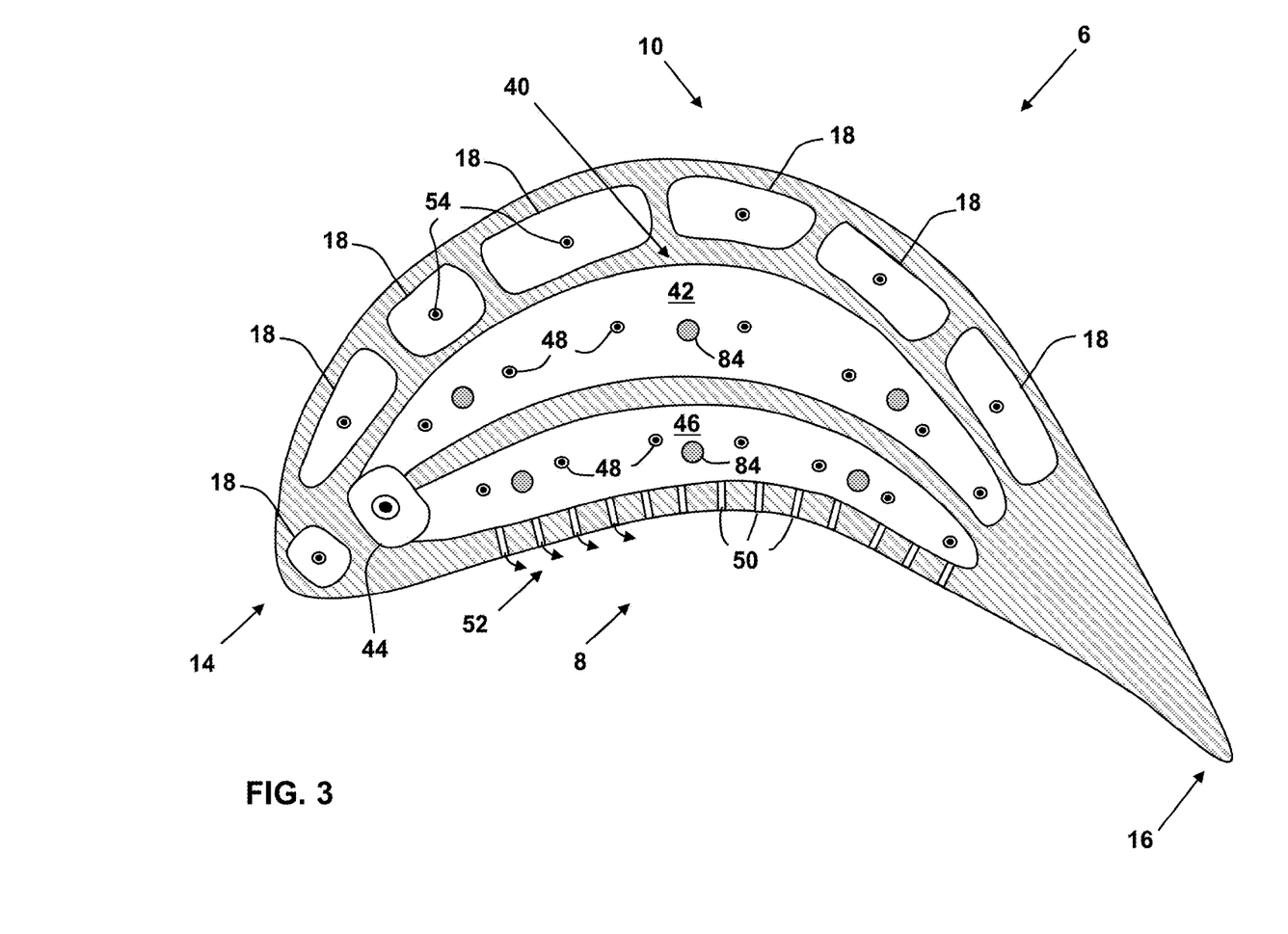
FIG. 3 is a cross-sectional view of a tip area of the multi-wall blade of FIG. 1, taken along line B-B in FIG. 1 according to various embodiments.

An embodiment including a forked passage cooling circuit 40 is depicted in FIG. 3, which is a cross-sectional view of the multi-wall blade 6 taken along line B-B of FIG. 1. The forked passage cooling circuit 40 is located radially outward along the multi-wall blade 6 (e.g., closer to the tip area 12 of the multi-wall blade 6) relative to the arrangement 30 of cooling channels shown in FIG. 2. To this extent, comparing FIGS. 2 and 3, the forked passage cooling circuit 40 effectively "shields" the central plenums 20 and at least some of the near wall cooling channels 18 from the very high heat loads that typically occur at the tip area 12 of the multi-wall blade 6 during rotation of the multi-wall blade 6 in a gas turbine).

The forked passage cooling circuit 40 includes a first leg 42 that extends over and at least partially covers the central plenums 20. The first leg 42 extends rearward from a forward air feed cavity 44 toward the trailing edge 16 of the multi-wall blade 6. Although shown in FIG. 3 as extending over all of the central plenums 20, the first leg 42 of the forked passage cooling circuit 40 may, in general, extend over one or more of the central plenums 20.

The forked passage cooling circuit 40 further includes a second leg 46 that extends over and at least partially covers a set (e.g., one or more) of the near wall cooling channels 18 disposed adjacent the pressure side 8 of the multi-wall blade 6. The second leg 46 extends rearward from the air feed cavity 44 toward the trailing edge 16 of the multi-wall blade 6. Comparing FIGS. 2 and 3, it can be seen that in an embodiment the second leg 46 extends over all of the near wall cooling channels 18 disposed adjacent the pressure side 8 of the multi-wall blade 6. In general, however, the second leg 46 of the forked passage cooling circuit 40 may extend over one or more of the near wall cooling channels 18 disposed adjacent the pressure side 8 of the multi-wall blade 6.

Cooling air is supplied to the first and second legs 42, 46 of the forked passage cooling circuit 40 via the air feed cavity 44. The air feed cavity 44 may be fluidly coupled to, and receive cooling air from, at least one of the central plenums 20. In other embodiments, the air feed cavity 44 may be fluidly coupled to, and receive cooling air from, at least one of the near wall cooling channels 18. In either case, in this embodiment, the air feed cavity 44 is disposed near the leading edge 14 of the multi-wall blade 6.

In FIG. 3, viewed in conjunction with FIGS. 1 and 2, cooling air flows from the air feed cavity 44 (e.g., out of the page in FIG. 3) into the first and second legs 42, 46 of the forked passage cooling circuit 40. In the first and second legs 42, 46 of the forked passage cooling circuit 40, the cooling air absorbs heat (e.g., via convention) from adjacent portions of the tip area 12 of the multi-wall blade 6, shielding the underlying near wall cooling channels 18 and central plenums 20 from excessive heat. The cooling air flows out of the first leg 42 (e.g., out the page in FIG. 3) via at least one tip film channel 48. Cooling air is directed by the tip film channels 48 to the tip 22 of the multi-wall blade 6. The cooling air is exhausted from the tip 22 of the multi-wall blade 6 as tip film 24 to provide tip film cooling.

Cooling air flows also out of the second leg 46 of the forked passage cooling circuit 40 (e.g., out the page in FIG. 3) via at least one tip film channel 48. As described above, cooling air is exhausted through the tip film channels 48 to the tip 22 of the multi-wall blade 6 to provide tip film 24 for tip film cooling. In addition, cooling air is exhausted out of the second leg 46 to the pressure side 8 of the multi-wall blade 6 through at least one pressure side film channel 50 to provide film 52 for pressure side film cooling.

Cooling air may also be exhausted from at least one of the near wall cooling channels 18 to the tip 22 to provide tip film cooling. For example, as shown in FIG. 3, at least one of the near wall cooling channels 18 may be fluidly coupled to the tip 22 of the multi-wall blade 6 by at least one tip film channel 54. Cooling air is exhausted (out of the page in FIG. 3) from the tip film channels 54 to provide tip film 24 for tip film cooling.

Figure 4:
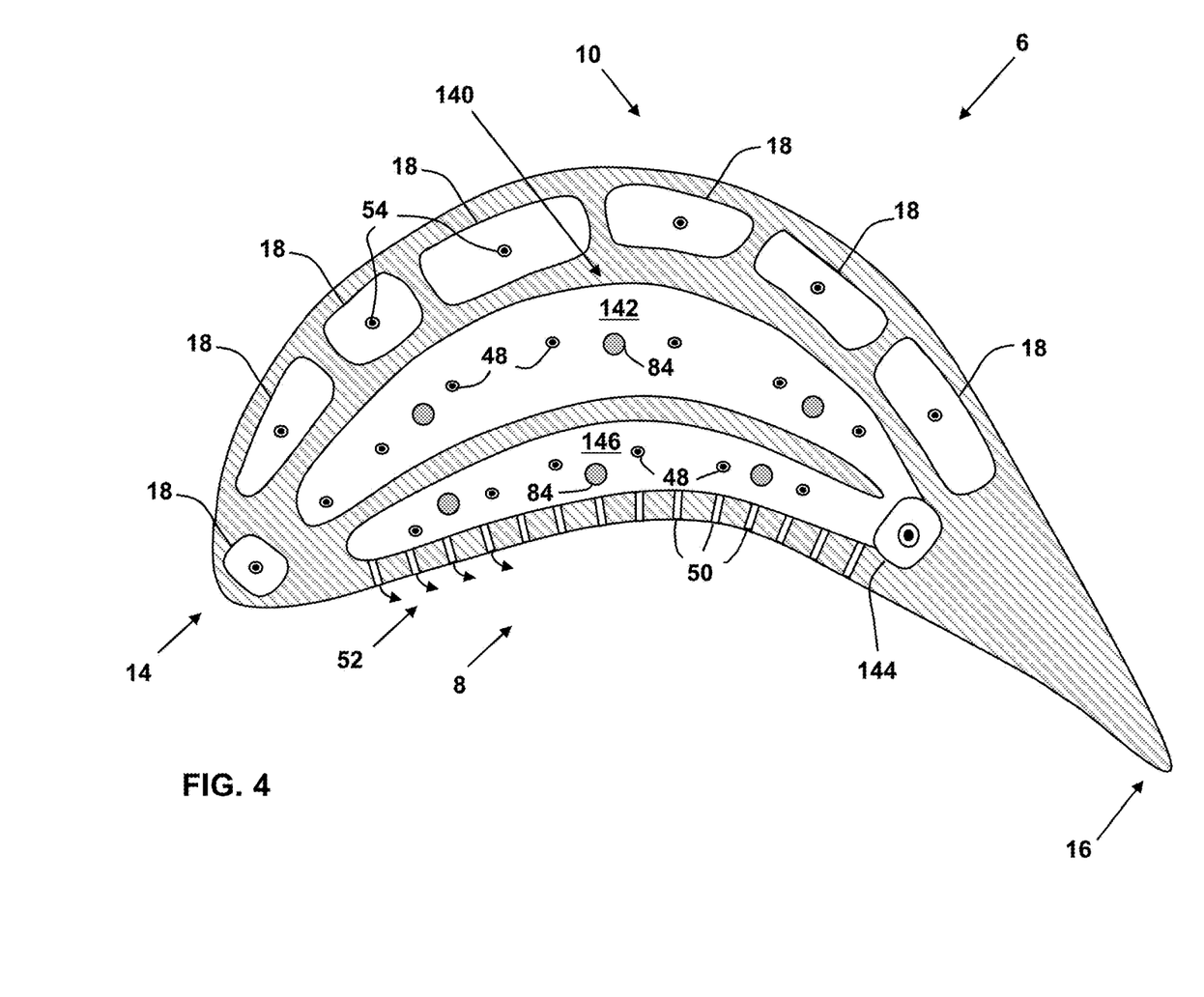
FIG. 4 is a cross-sectional view of a tip area of the multi-wall blade of FIG. 1, taken along line B-B in FIG. 1 according to various embodiments.

In another embodiment, first and second legs 142, 146 of a forked passage cooling circuit 140 may extend forward from an aft air feed cavity 144 toward the leading edge 16 of the multi-wall blade 6. Such a configuration is depicted in FIG. 4, viewed in conjunction with FIGS. 1 and 2. The air feed cavity 144 may be fluidly coupled to, and receive cooling air from, at least one of the central plenums 20 or at least one of the near wall cooling channels 18. As with the embodiment shown in FIG. 3, the forked passage cooling circuit 140 depicted in FIG. 4 is configured to shield the central plenums 20 and at least some of the pressure side near wall cooling channels 18 from the very high heat loads that typically occur at the tip area 12 of the multi-wall blade 6. Further, the forked passage cooling circuit 140 depicted in FIG. 4 is configured to provide tip film 24 and pressure side film 52 for tip film cooling and pressure side film cooling, respectively.

Figure 5:
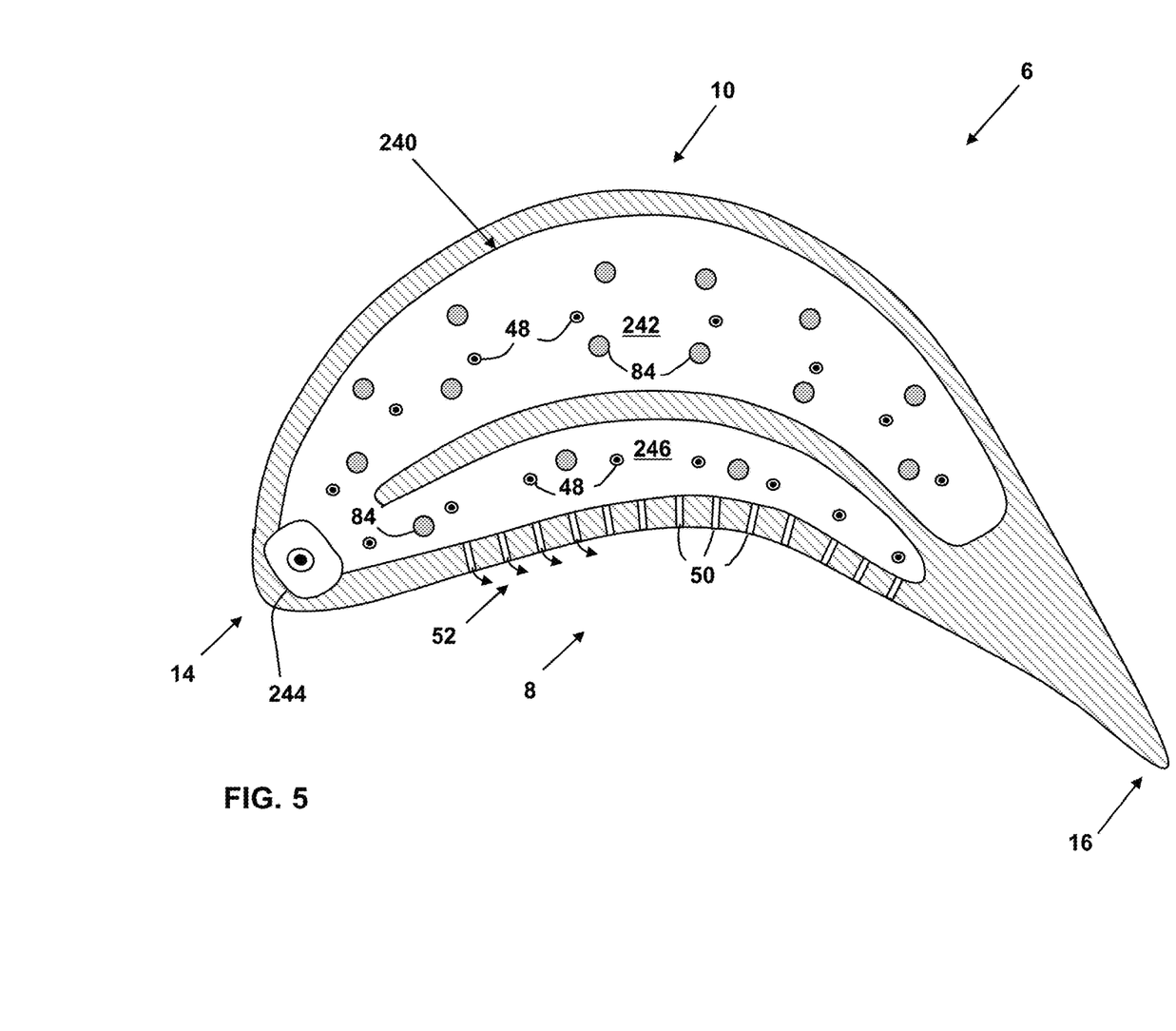
FIG. 5 is a cross-sectional view of a tip area of the multi-wall blade of FIG. 1, taken along line B-B in FIG. 1 according to various embodiments.

In yet another embodiment, as depicted in FIG. 5, viewed in conjunction with FIGS. 1 and 2, a first leg 242 of a forked passage cooling circuit 240 may be enlarged to extend over and at least partially cover not only the central plenums 20, but also a set (e.g., one or more) of the near wall cooling channels 18 disposed adjacent the suction side 10 of the multi-wall blade 6. As in the embodiment depicted in FIG. 3, a second leg 246 of the forked passage cooling circuit 240 extends over and at least partially covers a set (e.g., one or more) of the near wall cooling channels 18 disposed adjacent the pressure side 8 of the multi-wall blade 6.

An air feed cavity 244 may be fluidly coupled to, and receive cooling air from, at least one of near wall cooling channels 18 or at least one of the central plenums 20. The forked passage cooling circuit 240 depicted in FIG. 5 is configured to shield the central plenums 20, at least some of the suction side near wall cooling channels 18, and at least some of the pressure side near wall cooling channels 18 from the very high heat loads that typically occur at the tip area 12 of the multi-wall blade 6. Further, similar to the embodiment shown in FIG. 3, the forked passage cooling circuit 240 depicted in FIG. 5 is configured to provide tip film 24 and pressure side film 52 for tip film cooling and pressure side film cooling, respectively.

In FIG. 5, the air feed cavity 144 is disposed near the leading edge 14 of the multi-wall blade 6, with the first and second legs 242, 246 of the forked passage cooling circuit 40 extending toward the trailing edge 16 of the multi-wall blade 6. However, similar to the embodiment shown in FIG. 4, the air feed cavity 144 may be disposed near the trailing edge 16 of the multi-wall blade 6, with the first and second legs 242, 246 of the forked passage cooling circuit 240 extending toward the leading edge 16 of the multi-wall blade 6.

Figure 6:
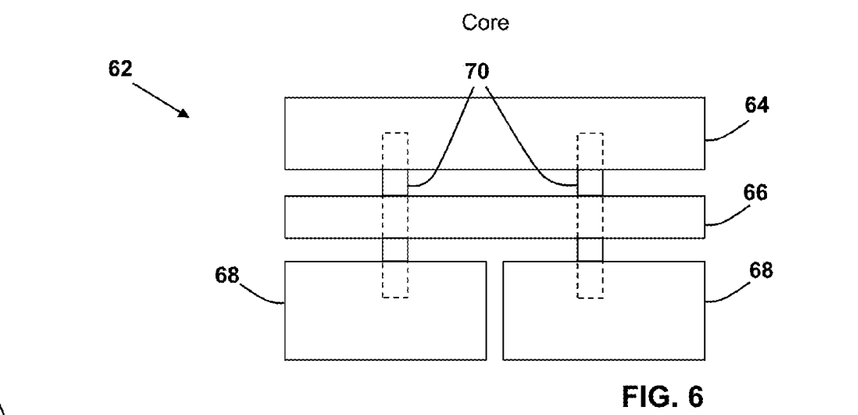
FIGS. 6-8 depict an illustrative method for forming a portion of a forked passage cooling circuit according to various embodiments.
Figure 7:
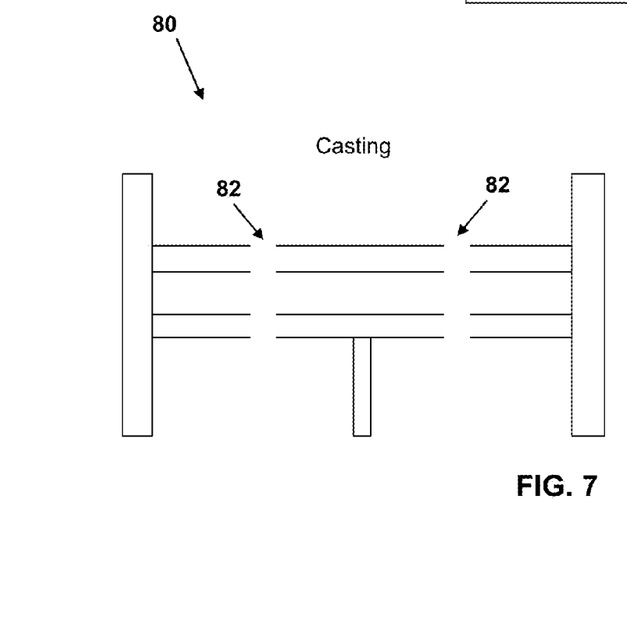
Figure 8:
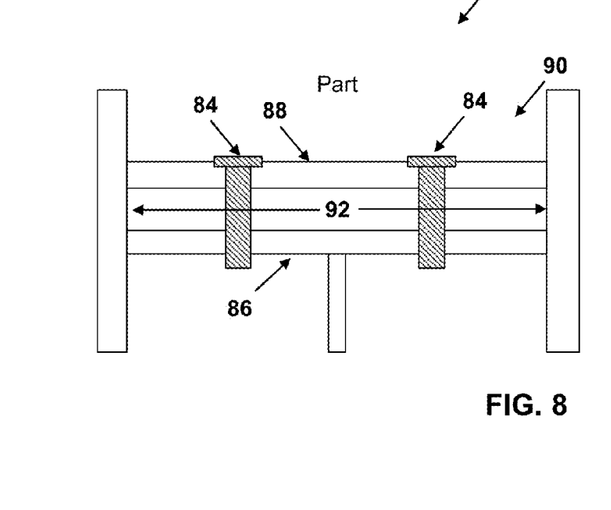

FIGS. 6-8 depict an illustrative method for forming a portion 60 of the forked passage cooling circuit 40 according to an embodiment. A cross-sectional view of a core 62 (e.g., a ceramic core) for use in a process for casting the portion 60 of the forked passage cooling circuit 40 is shown in FIG. 6.

The core 62 includes a squealer core section 64, a tip core section 66, and at least one body core section 68. Support rods 70 secure and separate the various core sections 64, 66, 68. The squealer core section 64 will form, after casting, a cavity at the tip 22 of the multi-wall blade 6 that is radially open to the outside. The tip core section 66 will form, after casting, one of the legs 42, 46 of the forked passage cooling circuit 40. The body core section 68 will form, after casting at least one of the near wall cooling channels 18 or central plenums 20.

An example of a metal casting 80 produced using the core 62 (e.g., using known casting techniques) is depicted in FIG. 7. The casting 80 includes a plurality of openings 82 corresponding to the locations of the support rods 70 in the core 62. According to an embodiment, as shown in FIG. 8, each opening 82 may be sealed using a metal (e.g., braze material) plug 84. The plug 84 can, for example, be inserted into an opening 82, press-fit or otherwise inserted into an intra-cavity rib 86 of the casting 80, and secured (e.g., via brazing) to the floor 88 of the squealer cavity 90 and the intra-cavity rib 86. To this extent, the plugs 84 extend completely through the opening 92 between the intra-cavity rib 86 and the floor 88 of the squealer cavity 90, preventing cooling air from leaking out of the opening 92 through the openings 82.

The opening 92 between the intra-cavity rib 86 and the floor 88 of the squealer cavity 90 may be used, for example, to provide one of the legs 42, 46 of the forked passage cooling circuit 40, with the plugs 84 oriented substantially perpendicular to the flow of cooling air (e.g., into or out of the page in FIG. 8) through the opening 92. In this position, the plugs 84 not only seal the openings 82 on opposing sides of the opening 92, but also serve as cooling pins, increasing the cooling effectiveness of the forked passage cooling circuit 40 by improving convective heat flow and prompting turbulent air flow. Possible locations of the plugs 84 in the first and second legs 42, 46 of the forked passage cooling circuit 40 are shown in FIGS. 3-5. The depicted locations of the plugs 84 in FIGS. 3-5 are for illustration only and are not meant be limiting.

FIG. 9 shows a schematic view of gas turbomachine 102 as may be used herein. The gas turbomachine 102 may include a compressor 104. The compressor 104 compresses an incoming flow of air 106. The compressor 104 delivers a flow of compressed air 108 to a combustor 110. The combustor 110 mixes the flow of compressed air 108 with a pressurized flow of fuel 112 and ignites the mixture to create a flow of combustion gases 114. Although only a single combustor 110 is shown, the gas turbine system 102 may include any number of combustors 110. The flow of combustion gases 114 is in turn delivered to a turbine 116, which typically includes a plurality of turbine buckets 2 (FIG. 1). The flow of combustion gases 114 drives the turbine 116 to produce mechanical work. The mechanical work produced in the turbine 116 drives the compressor 104 via a shaft 118, and may be used to drive an external load 120, such as an electrical generator and/or the like.

In various embodiments, components described as being "coupled" to one another can be joined along one or more interfaces. In some embodiments, these interfaces can include junctions between distinct components, and in other cases, these interfaces can include a solidly and/or integrally formed interconnection. That is, in some cases, components that are "coupled" to one another can be simultaneously formed to define a single continuous member. However, in other embodiments, these coupled components can be formed as separate members and be subsequently joined through known processes (e.g., fastening, ultrasonic welding, bonding).

When an element or layer is referred to as being "on", "engaged to", "connected to" or "coupled to" another element, it may be directly on, engaged, connected or coupled to the other element, or intervening elements may be present. In contrast, when an element is referred to as being "directly on," "directly engaged to", "directly connected to" or "directly coupled to" another element, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A cooling system for a multi-wall blade, the multi-wall blade including at least one central plenum and a first set of near wall cooling channels, comprising:
    a forked passage cooling circuit, the forked passage cooling circuit including a first leg and a second leg; and
    an air feed cavity for supplying cooling air to the first leg and the second leg of the forked passage cooling circuit;
    wherein the first leg and the second leg of the forked cooling circuit are located at a radial position along the multi-wall blade that is closer to a tip area of the multi-wall blade than the at least one central plenum and the first set of near wall cooling channels, wherein the first leg of the forked passage cooling circuit extends radially outward from and at least partially over the at least one central plenum of the multi-wall blade, and wherein the second leg of the forked passage cooling circuit extends radially outward from and at least partially over the first set of near wall cooling channels in the multi-wall blade.

2. The cooling system of claim 1, wherein the first leg and the second leg of the forked passage cooling circuit extend from the air feed cavity toward a trailing edge of the multi-wall blade.

3. The cooling system of claim 1, wherein the first leg and the second leg of the forked passage cooling circuit extend from the air feed cavity toward a leading edge of the multi-wall blade.

4. The cooling system of claim 1, wherein the first set of near wall cooling channels is located adjacent a pressure side of the multi-wall blade.

5. The cooling system of claim 1, wherein the first leg of the forked passage cooling circuit extends over and at least partially over a second set of near wall cooling channels in the multi-wall blade, wherein the first leg of the forked cooling circuit is located at a radial position along the multi-wall blade that is closer to the tip area of the multi-wall blade than the second set of near wall cooling channels.

6. The cooling system of claim 5, wherein the second set of near wall cooling channels is located adjacent a suction side of the multi-wall blade.

7. The cooling system of claim 1, wherein at least one of the first leg or the second leg of the forked passage cooling circuit includes at least one tip film channel for directing the cooling air to a tip of the multi-wall blade to provide tip film.

8. The cooling system of claim 1, wherein the second leg of the forked passage cooling circuit includes at least one pressure side film channel for directing the cooling air to a pressure side of the multi-wall blade to provide pressure side film.

9. The cooling system of claim 1, wherein the cooling air is supplied to the air feed cavity from the at least one central plenum or the first set of near wall cooling channel of the multi-wall blade.

10. A multi-wall turbine blade, comprising:
    a cooling system disposed within the multi-wall turbine blade, the multi-wall blade including at least one central plenum and a first set of near wall cooling channels, the cooling system including:
        a forked passage cooling circuit, the forked passage cooling circuit including a first leg and a second leg; and
        an air feed cavity for supplying cooling air to the first leg and the second leg of the forked passage cooling circuit;
        wherein the first leg and the second leg of the forked cooling circuit are located at a radial position along the multi-wall blade that is closer to a tip area of the multi-wall blade than the at least one central plenum and the first set of near wall cooling channels, wherein the first leg of the forked passage cooling circuit extends radially outward from and at least partially over the at least one central plenum of the multi-wall blade, and wherein the second leg of the forked passage cooling circuit extends radially outward from and at least partially over the first set of near wall cooling channels in the multi-wall blade.

11. The multi-wall turbine blade of claim 10, wherein the first leg and the second leg of the forked passage cooling circuit extend from the air feed cavity toward a trailing edge of the multi-wall blade.

12. The multi-wall turbine blade of claim 10, wherein the first leg and the second leg of the forked passage cooling circuit extend from the air feed cavity toward a leading edge of the multi-wall blade.

13. The multi-wall turbine blade of claim 10, wherein the first set of near wall cooling channels is located adjacent a pressure side of the multi-wall blade.

14. The multi-wall turbine blade of claim 10, wherein the first leg of the forked passage cooling circuit extends over and at least partially over a second set of near wall cooling channels in the multi-wall blade, wherein the first leg of the forked cooling circuit is located at a radial position along the multi-wall blade that is closer to the tip area of the multi-wall blade than the second set of near wall cooling channels.

15. The multi-wall turbine blade of claim 14, wherein the second set of near wall cooling channels is located adjacent a suction side of the multi-wall blade.

16. The multi-wall turbine blade of claim 10, wherein at least one of the first leg or the second leg of the forked passage cooling circuit includes at least one tip film channel for directing the cooling air to a tip of the multi-wall blade to provide tip film.

17. The multi-wall turbine blade of claim 10, wherein the second leg of the forked passage cooling circuit includes at least one pressure side film channel for directing the cooling air to a pressure side of the multi-wall blade to provide pressure side film.

18. The multi-wall turbine blade of claim 10, wherein the cooling air is supplied to the air feed cavity from the at least one central plenum or the first set of near wall cooling channel of the multi-wall blade.

19. The multi-wall turbine blade of claim 10, wherein the multi-wall turbine blade forms a portion of a turbine bucket, and wherein the turbine bucket includes a shank coupled to the multi-wall turbine blade.

20. A turbomachine, comprising:
- a gas turbine system including a compressor component, a combustor component, and a turbine component, the turbine component including a plurality of turbine buckets, and wherein at least one of the turbine buckets includes a multi-wall blade; and
- a cooling system disposed within the multi-wall blade, the multi-wall blade including at least one central plenum and a first set of near wall cooling channels, the cooling system including:
  - a forked passage cooling circuit, the forked passage cooling circuit including a first leg and a second leg; and
  - an air feed cavity for supplying cooling air to the first leg and the second leg of the forked passage cooling circuit;
  - wherein the first leg and the second leg of the forked cooling circuit are located at a radial position along the multi-wall blade that is closer to a tip area of the multi-wall blade than the at least one central plenum and the first set of near wall cooling channels, wherein the first leg of the forked passage cooling circuit extends radially outward from and at least partially over the at least one central plenum of the multi-wall blade, and wherein the second leg of the forked passage cooling circuit extends radially outward from and at least partially over the first set of near wall cooling channels in the multi-wall blade.

\* \* \* \* \*